US008422044B2

(12) United States Patent
Miyashita

(10) Patent No.: US 8,422,044 B2
(45) Date of Patent: Apr. 16, 2013

(54) PRINT CONTROL METHOD CAPABLE OF MANAGING FUNCTIONS INCORPORATED IN PRINTING DEVICE

(75) Inventor: Ryuichi Miyashita, Kobe (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 1621 days.

(21) Appl. No.: 11/583,028

(22) Filed: Oct. 19, 2006

(65) Prior Publication Data
US 2008/0007758 A1    Jan. 10, 2008

(30) Foreign Application Priority Data
Jun. 30, 2006  (JP) ................. 2006-181995

(51) Int. Cl.
G06K 15/00 (2006.01)
G06F 3/12 (2006.01)

(52) U.S. Cl.
USPC ................. 358/1.14; 358/1.15; 358/1.13

(58) Field of Classification Search .......... None
See application file for complete search history.

(56) References Cited

U.S. PATENT DOCUMENTS

| 2002/0089693 | A1* | 7/2002 | Maruyama | 358/1.15 |
|---|---|---|---|---|
| 2003/0086111 | A1* | 5/2003 | Akiyoshi | 358/1.14 |
| 2004/0141203 | A1 | 7/2004 | Honma | |
| 2005/0162684 | A1* | 7/2005 | Brown et al. | 358/1.15 |
| 2005/0185211 | A1* | 8/2005 | Foehr et al. | 358/1.15 |
| 2005/0223012 | A1* | 10/2005 | Ohkohchi | 707/10 |
| 2005/0275868 | A1* | 12/2005 | Higashiura et al. | 358/1.14 |
| 2006/0132823 | A1* | 6/2006 | Sakamoto | 358/1.14 |
| 2007/0109593 | A1* | 5/2007 | Ohta et al. | 358/1.15 |
| 2007/0285702 | A1* | 12/2007 | Akiyoshi | 358/1.14 |
| 2008/0106560 | A1* | 5/2008 | Shibusawa | 347/14 |
| 2009/0174889 | A1* | 7/2009 | Lee et al. | 358/1.13 |
| 2010/0046021 | A1* | 2/2010 | Inui et al. | 358/1.13 |

FOREIGN PATENT DOCUMENTS

| JP | 2002-342059 | | 11/2002 |
|---|---|---|---|
| JP | 2003-216374 | | 7/2003 |
| JP | 2004-178306 | | 6/2004 |
| JP | 2004178306 A | * | 6/2004 |
| JP | 2004-220532 | | 8/2004 |
| JP | 2005-45426 | | 2/2005 |
| JP | 2005-293015 | | 10/2005 |
| JP | 2006-094530 | | 4/2006 |
| JP | 2006-113812 | | 4/2006 |
| JP | 2006113812 A | * | 4/2006 |

* cited by examiner

Primary Examiner — Satwant Singh
(74) Attorney, Agent, or Firm — Buchanan Ingersoll & Rooney PC

(57) ABSTRACT

When a printer driver of a user's PC connected to a printing device is activated, it transmits user information, division information and the like to the printing device, and inquires about any restriction on its functions. The printer driver acquires, from the printing device, information regarding a restriction set on a user or on a division, a restriction due to a configuration and a restriction set for a period, as well as a message input by an administrator. It displays the functions of the printing device on a screen presented upon activation of the driver, in such a manner that the function of which the use is restricted is grayed out to indicate that the function is unusable, and also displays the type of the restriction and the corresponding message input by the administrator.

20 Claims, 17 Drawing Sheets

FIG.6

| | |
|---|---|
| 1000 | "STAPLES HAVE RUN OUT." |
| 1001 | "TONER HAS RUN OUT." |
| : | : |
| 1111 | "PLEASE ATTACH ANY OF THE FOLLOWING FINISHERS: FS-501, FS-502, FS-504." |

FIG.7

| | STAPLING | HOLE PUNCHING | BINDING |
|---|---|---|---|
| USER A | ✓ | ✓ | |
| USER B | | ✓ | ✓ |
| USER C | | | ✓ |
| : | : | : | : |
| DIVISION K | ✓ | ✓ | |
| DIVISION L | ✓ | ✓ | ✓ |
| DIVISION M | | | |

FIG.8

| STAPLING | STATE OF CONFIGURATION FIXED MESSAGE | ERROR: OUT OF STAPLES |
| --- | --- | --- |
| | | 1000 |
| | RESTRICTION OF PERIOD | 2006/04/01 |
| | | 2006/04/10 |
| | RESTRICTION OF USER | NO |
| | RESTRICTION OF DIVISION | NO |
| | INPUT MESSAGE | "THEY ARE ON ORDER NOW." |
| HOLE PUNCHING | STATE OF CONFIGURATION FIXED MESSAGE | UNAVAILABLE |
| | | 1111 |
| | RESTRICTION OF PERIOD | – |
| | | – |
| | RESTRICTION OF USER | – |
| | RESTRICTION OF DIVISION | – |
| | INPUT MESSAGE | – |
| BINDING | STATE OF CONFIGURATION FIXED MESSAGE | AVAILABLE |
| | | – |
| | RESTRICTION OF PERIOD | – |
| | | – |
| | RESTRICTION OF USER | YES |
| | RESTRICTION OF DIVISION | NO |
| | INPUT MESSAGE | "PLEASE CONTACT THE ADMINISTRATOR." |

FIG.9

| ADMINISTRATOR RESTRICTION LIST | | | |
|---|---|---|---|
| BINDING | STATE OF CONFIGURATION | AVAILABLE | |
| | FIXED MESSAGE | – | |
| | RESTRICTION OF PERIOD | – | |
| | | – | |
| | RESTRICTION OF USER | YES | |
| | RESTRICTION OF DIVISION | NO | |
| | INPUT MESSAGE | "PLEASE CONTACT THE ADMINISTRATOR." | |
| XXXXX | STATE OF CONFIGURATION | AVAILABLE | |
| | FIXED MESSAGE | – | |
| | RESTRICTION OF PERIOD | – | |
| | | – | |
| | RESTRICTION OF USER | YES | |
| | RESTRICTION OF DIVISION | NO | |
| | INPUT MESSAGE | "XXXXXXXX" | |

FIG.10

| PERMANENT RESTRICTION LIST | | |
|---|---|---|
| HOLE PUNCHING | STATE OF CONFIGURATION | UNAVAILABLE |
| | FIXED MESSAGE | 1111 |
| | RESTRICTION OF PERIOD | – |
| | | – |
| | RESTRICTION OF USER | – |
| | RESTRICTION OF DIVISION | – |
| | INPUT MESSAGE | – |
| ZZZZZ | STATE OF CONFIGURATION | UNAVAILABLE |
| | FIXED MESSAGE | 1111 |
| | RESTRICTION OF PERIOD | – |
| | | – |
| | RESTRICTION OF USER | – |
| | RESTRICTION OF DIVISION | – |
| | INPUT MESSAGE | – |

FIG.11

| TEMPORARY RESTRICTION LIST | | |
|---|---|---|
| STAPLING | STATE OF CONFIGURATION FIXED MESSAGE | ERROR: OUT OF STAPLES |
| | | 1000 |
| | RESTRICTION OF PERIOD | 2006/04/01 |
| | | 2006/04/10 |
| | RESTRICTION OF USER | NO |
| | RESTRICTION OF DIVISION | NO |
| | INPUT MESSAGE | "THEY ARE ON ORDER NOW." |
| YYYYYY | STATE OF CONFIGURATION FIXED MESSAGE | AVAILABLE |
| | | – |
| | RESTRICTION OF PERIOD | YYYY/MM/DD |
| | | YYYY/MM/DD |
| | RESTRICTION OF USER | YES |
| | RESTRICTION OF DIVISION | NO |
| | INPUT MESSAGE | "YYYYYYYY" |

PRINT CONTROL METHOD CAPABLE OF MANAGING FUNCTIONS INCORPORATED IN PRINTING DEVICE

This application is based on Japanese Patent Application No. 2006-181995 filed with the Japan Patent Office on Jun. 30, 2006, the entire content of which is hereby incorporated by reference.

BACKGROUND OF THE INVENTION

1. Field of the Invention

The present invention relates to a print control method and a print control apparatus, and particularly to a print control method and a print control apparatus that manage functions incorporated in a printing device.

2. Description of the Related Art

When a printing device such as a printer is used in the network environment, a printer driver identified as software for operating the printing device is installed in an information processing apparatus (hereinafter, referred to as "PC") connected to the printing device in a wired or wireless manner. A user uses the printer driver to cause the printing device to perform printing, by designating a function (e.g., stapling) of the printing device he/she desires to use.

The use of the functions of the printing device may be restricted depending on a user or the state of configuration of the printing device. It is often the case that a printer driver is configured to display a fixed message when a function of which use is restricted is designated as the function desired to be used.

In recent years, the printing devices have increasingly been improved and diversified in terms of functions, as represented by an MFP (Multi Function Peripheral) or the like. Accordingly, there is an increasing demand to restrict the use of the functions on a per-division basis, on a per-user basis, or on a per-period basis. In response to such a demand, a recent printing device allows an administrator or the like to restrict the use of individual functions for particular users.

In the case where the use of the function a user is desired to use is restricted, if a fixed message alone is displayed as described above, the user operating a PC to perform printing cannot understand the reason why the use of the function is restricted, i.e., whether the use of the relevant function is restricted by an administrator or the like on a per-division basis, per-user basis or per-period basis, or whether the function is temporarily unusable doe to a shortage of resources or an error, or whether the function is unavailable with the current state of configuration of the printing device.

Japanese Laid-Open Patent Publication No. 2005-045426, for example, discloses a composite machine that provides a display on an operation panel indicating whether the scanner is temporarily unusable or requires repair to make it usable. With this technique, however, when a user is operating a PC at a distance from the printing device remotely via a network, he/she cannot understand the reason why the use is restricted. As such, it is difficult for a user operating printing on a PC to determine whether there is a possibility that the relevant function becomes available by contacting the administrator, or whether he/she should wait until when the function becomes usable.

SUMMARY OF THE INVENTION

The present invention provides a print control method and a print control apparatus that can notify, in the case where use of a function incorporated in a printing device is restricted, of the reason why the use is restricted, when a printer driver is used to operate the printing device.

According to an aspect of the present invention, a print control method is for controlling a printing device incorporating a function related to printing by using a print control apparatus. The method includes: an acquiring step of acquiring information indicating that a restriction is set on use of the function of the printing device in the print control apparatus; and a presenting step of presenting that the use of the function is restricted and a type of the restriction based on the information in the print control apparatus.

According to another aspect of the present invention, a print control method is for controlling a printing device by using a print control apparatus. The method includes the steps of: inputting a message in the print control apparatus; and presenting the message in response to a prescribed manipulation made to the printing device.

According to a further aspect of the present invention, a print control apparatus controls a printing device incorporating a function related to printing. The apparatus includes: an inquiring unit inquiring about a restriction of use of the function of the printing device; an acquiring unit acquiring information regarding the restriction of use of the function in response to the inquiry; and a presenting unit presenting that the use of the function is restricted and a type of the restriction of the function based on the information.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 shows a specific example of a fixed message table.

FIG. 7 shows a specific example of a table representing the restriction of use of functions set on a per-user basis and per-division basis.

FIG. 8 shows a specific example of a function restriction list.

FIG. 9 shows a specific example of an administrator restriction list.

FIG. 10 shows a specific example of a permanent restriction list.

FIG. 11 shows a specific example of a temporary restriction list.

DESCRIPTION OF THE PREFERRED EMBODIMENTS

Figure 1:
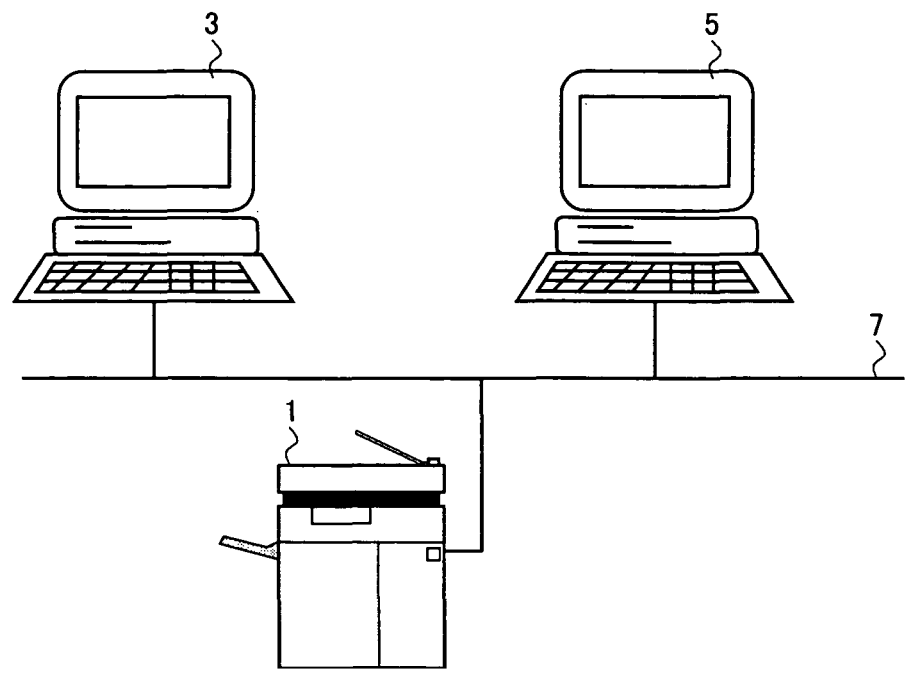
FIG. 1 shows a specific example of configuration of a print system according to an embodiment.

Hereinafter, an embodiment of the present invention will be described with reference to the drawings. In the following, the same parts and elements have the same reference characters allotted, and their designations and functions are identical.

Referring to FIG. 1, a print system according to the present embodiment includes a printing device 1, a computer for a network administrator (hereinafter, referred to as "administrator's PC") 3, and a computer for a person who executes printing (hereinafter, referred to as "user's PC") 5, which are connected via a wired or wireless network 7.

Printing device 1 may be a printer, a copier, an MFP (Multi Function Peripheral) as a combination thereof, or the like. It is assumed in the present embodiment that printing device 1 is an MFP.

Figure 2:
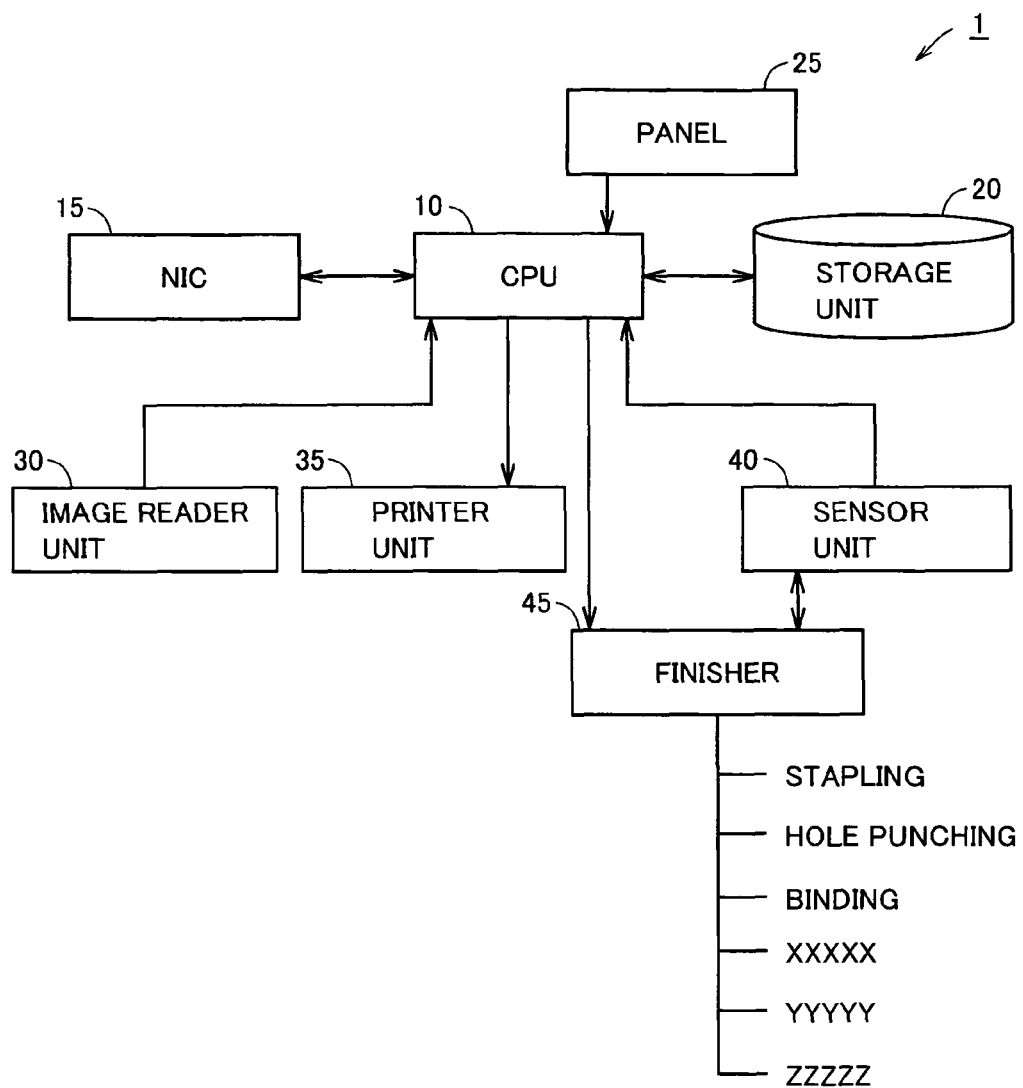
FIG. 2 is a block diagram showing a specific example of hardware configuration of a printing device 1 that is an MFP.

Referring to FIG. 2, printing device 1 includes: a CPU (Central Processing Unit) 10 controlling the entire device; an image reader unit 30 reading image data from an original; a printer unit 35 printing an image on a sheet of paper; a NIC (Network Interface Card) 15 that is an expansion card inserted into an expansion slot (not shown) for connecting printing device 1 to network 7 or a telephone line, or for performing close-range radio communication; a storage unit 20 formed of a HD (Hard Disk), a RAM (Random Access Memory) and the like for storing a job, a program executed by CPU 10 and the like; a panel 25 that is an interface with a user; a finisher 45 incorporating functions for performing various processing on a printed sheet; and a sensor unit 40 detecting the remaining amounts of the print sheets, consumable supplies used in the finisher, and the like. Typical functions incorporated in finisher 45 include a "stapling" function of holding the printed sheets in place using staples, a "hole punching" function of cutting holes at prescribed positions of the printed sheets, and a "binding" function of binding the printed sheets by joining them at a prescribed side using an adhesive or dedicated tape.

Figure 3:
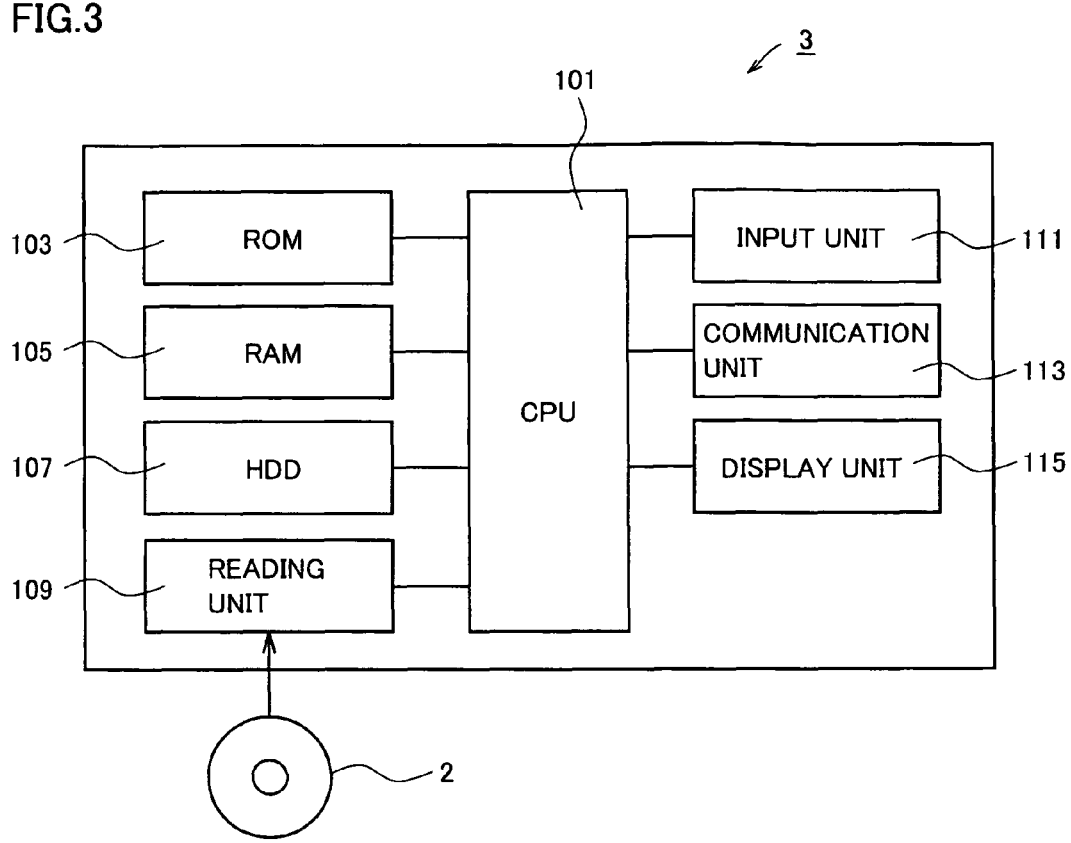
FIG. 3 is a block diagram showing a specific example of hardware configuration of an administrator's PC 3 and a user's PC 5.

Administrator's PC 3 and user's PC 5 may each be a personal computer or the like. FIG. 3 is a block diagram showing a specific example of hardware configuration of a common personal computer, as a specific example of the hardware configuration of administrator's PC 3 and user's PC 5.

Referring to FIG. 3, administrator's PC 3 and user's PC 5 each include: a CPU 101 controlling the entire device; a ROM (Read Only Memory) 103; a RAM 105; a hard disk drive 107; a reading unit 109 reading information from a recording medium 2, such as a FDD (Flexible Disk Drive) or a CD-ROM (Compact Disk-Read Only Memory) drive; an input unit 111 formed with a keyboard, mouse and the like; a communication unit 113 for connecting to network 7 or for communicating with the outside; and a display unit 115.

Administrator's PC 3 exerts a function of remote setting tool as CPU 101 reads and executes a remote setting tool program for implementing the remote setting tool, stored in ROM 103 or the like, for remotely performing various kinds of setting of printing device 1. The function of remote setting tool is formed on CPU 101 that executes the above-described program. Alternatively, at least a part thereof may be realized with the hardware configuration of administrator's PC 3 shown in FIG. 3.

Figure 4:
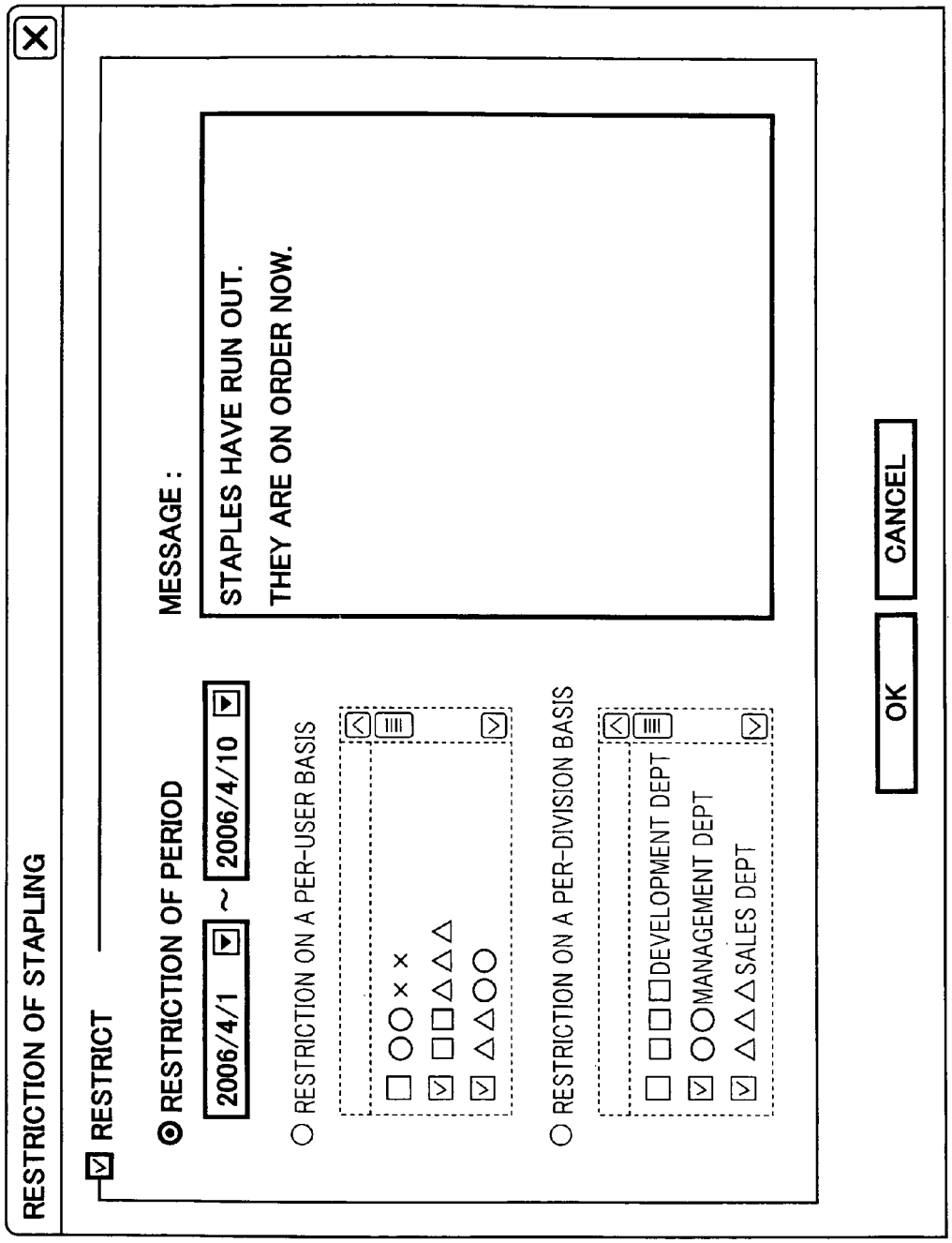
FIG. 4 shows a specific example of a setting screen.

The remote setting tool receives setting of a restriction of use for each function of printing device 1, and sends the received information to printing device 1. FIG. 4 shows a specific example of a setting screen that is a UI (User Interface) of the remote setting tool. The setting screen shown in FIG. 4 is displayed when a function for which a restriction is to be set is selected on a menu screen (not shown) that shows the respective functions of printing device 1 in a selectable manner. The screen displayed is used for performing setting about the relevant function.

Referring to FIG. 4, specific examples of the restriction of use that may be set for a function of printing device 1 include: a restriction of use on a per-period basis; a restriction of use on a per-user basis; and a restriction of use on a per-division basis such as a section or a department. It is assumed in the present embodiment that these three types of restrictions can be set using the setting screen shown in FIG. 4. In the following specific example, the restriction of use on a per-user basis and the restriction of use on a per-division basis are regarded as different types of restrictions. Alternatively, distinction of the division may be included in distinction of the user, in which case setting of the restriction of use on a per-division basis may be included in setting of the restriction of use on a per-user basis.

More specifically, when the use is to be restricted on a per-period basis, the period prohibiting the use of the function or the period permitting the use thereof may be received. When the use is to be restricted on a per-user basis, the user permitted to use the function or the user prohibited to use the same may be received. When the use is to be restricted on a per-division basis, the division permitted to use the function or the division prohibited to use the same may be received.

In FIG. 4, for the sake of expressing the screen on paper, selectable areas are shown using bold lines and bold letters, while non-selectable areas are shown in thin, dotted lines and thin letters, to indicate that on the setting screen, the restriction on a per-user basis and the restriction on a per-division basis, other than the restriction of period of use that has been set, are displayed in a gray-out manner. That the particular items are grayed out as described above means that these three types of restrictions are set exclusively in this example, although it is of course possible to configure such that a plurality of types of restrictions can be set for a single function.

The remote setting tool also receives, via the UI shown in FIG. 4, an input of a message (hereinafter, referred to as "input message") presenting the restriction set for a function from printing device 1 to user's PC 5. Specifically, referring to FIG. 4, when the setting restricting the use on a per-period basis is input, an input of the message related to the restriction is also received. Similarly, when the use is restricted on a per-user basis or on a per-division basis, an input of a message related to the restriction is also received.

The remote setting tool of administrator's PC 3 receives these inputs from the administrator or the like, and outputs the setting of the restriction and the message in association with each other to printing device 1 via network 7.

Figure 5:
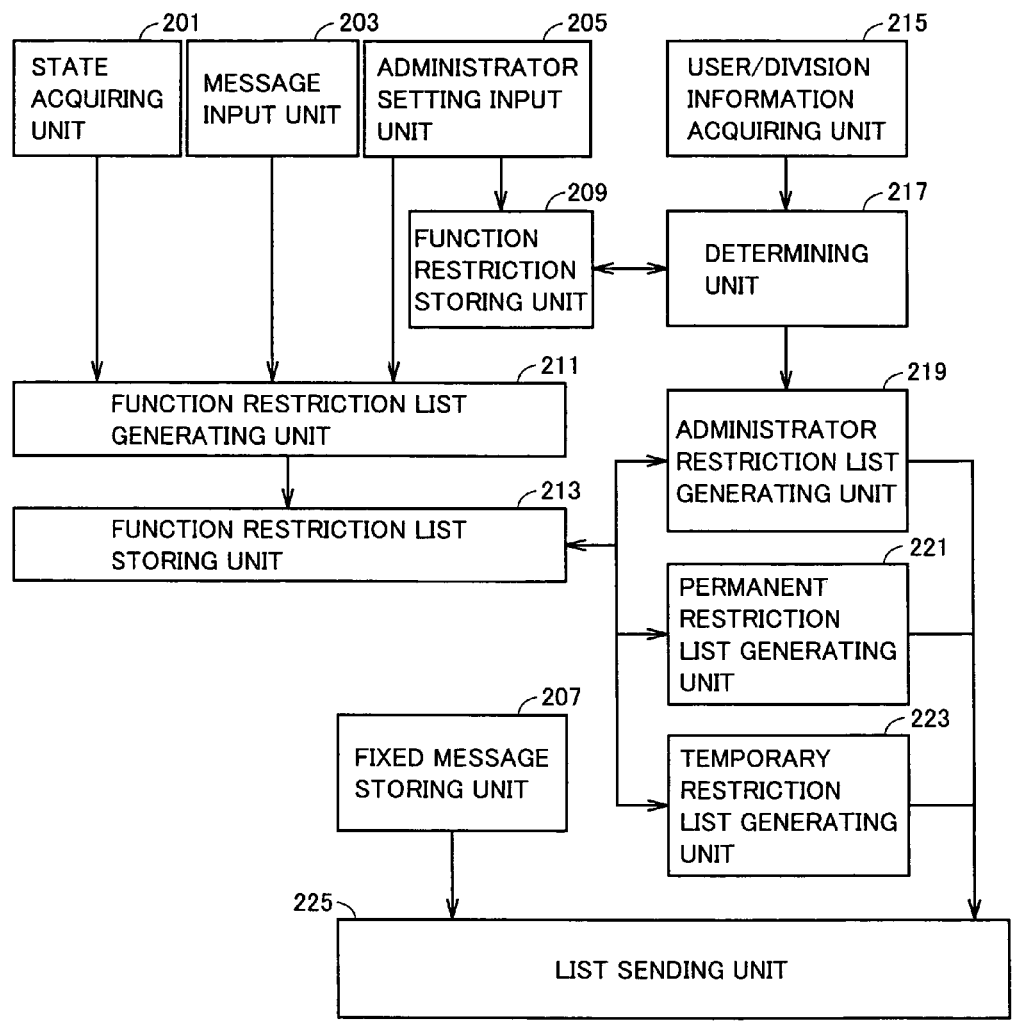
FIG. 5 is a block diagram showing a specific example of functional configuration for presenting to a user the information regarding the restriction of use of functions in printing device 1.

Functional units for presenting to the user the information regarding the restriction of use of functions in printing device 1, shown in FIG. 5, are formed at CPU 10 of printing device 1 as CPU 10 reads and executes a program stored in storage unit 20. Alternatively, at least a part thereof may be realized with the hardware configuration shown in FIG. 2.

Referring to FIG. 5, the above-described functional units of printing device 1 include: a state acquiring unit 201, a message input unit 203, an administrator setting input unit 205, a fixed message storing unit 207, a function restriction storing unit 209, a function restriction list generating unit 211, a function restriction list storing unit 213, a user/division information acquiring unit 215, a determining unit 217, an administrator restriction list generating unit 219, a permanent restriction list generating unit 221, a temporary restriction list generating unit 223, and a list sending unit 225.

State acquiring unit 201 detects a situation of each function at the timing upon power-on of printing device 1, reattachment of the finisher or the like, and acquires a state of each function based on the detected result as well as a sensing result of sensor unit 40. The acquired information may indicate that a particular function is in an unusable state due to a shortage of resources that are consumable supplies like staples, that a particular function is in an unusable state due to an error such as paper jam, or that a particular function is in an unusable state due to a configuration of the finisher (i.e., the function is not supported by the finisher, for example). The acquired information is provided to function restriction list generating unit 211.

Fixed message storing unit 207 stores a fixed message table in which fixed messages each presented to a user primarily when a particular function is in an unusable state due to the configuration of the finisher are prestored. FIG. 6 shows a specific example of the fixed message table stored in fixed message storing unit 207. The fixed message table stores a fixed message and an identifier for specifying the message in a pair. The identifier may be an address where the relevant fixed message is stored in a storage area of CPU 10 or storage unit 20 constituting the fixed message storing unit 207.

Administrator setting input unit 205 receives setting of restrictions on functions input by an administrator from administrator's PC 3 via network 7, and provides the same to function restriction list generating unit 211. The setting is also stored in function restriction storing unit 209. FIG. 7 is a specific example of a table showing information regarding the restrictions on functions set by an administrator, specifically showing the restrictions of use of functions set on a per-user basis and on a per-division basis. The table stored in function restriction storing unit 209 stores, for each function incorporated in printing device 1, permission (checked in FIG. 7) or prohibition (blank in FIG. 7) of use thereof for each user and for each division.

Message input unit 203 receives an input message input by the administrator from administrator's PC 3 via network 7, and provides the same to function restriction list generating unit 211.

Function restriction list generating unit 211 generates a function restriction list representing a restriction and a message set for each function, based on the information received from state acquiring unit 201, message input unit 203, and administrator setting input unit 205, and stores the same in function restriction list storing unit 213.

FIG. 8 shows a specific example of a function restriction list stored in function restriction list storing unit 213. Referring to FIG. 8, the function restriction list stores, for each function, the current state of configuration of printing device 1 based on the state acquired by state acquiring unit 201 and an identifier specifying the fixed message preset corresponding to the relevant state, a period during which the use is restricted (or a period during which the use is permitted) in the case where the use is restricted on a per-period basis, presence/absence of a restriction on a per-user basis, presence/absence of a restriction on a per-division basis, and any message input from the administrator related to these restrictions, based on the setting received from administrator setting input unit 205.

User/division information acquiring unit 215 acquires, from user's PC 5 via the network, information (hereinafter, "user information") regarding a user who uses the printer driver of user's PC 5 to perform an operation of printing device 1, and/or information (hereinafter, "division information") regarding a division to which the user belongs, and provides the same to determining unit 217. The user information may include a user name. It may include, in place of or in addition to the user name, identification information such as a password. Similarly, the division information may include a division name. It may include identification information such as a password in place of or in addition to the division name.

Determining unit 217 compares the user or division information input from user/division information acquiring unit 215 with the contents of the table (FIG. 7) in function restriction storing unit 209 storing the restrictions on functions on a per-user or per-division basis, and determines whether the input user or division information corresponds to the user or the division for which the use of any function is restricted. It then provides the result of determination to administrator restriction list generating unit 219.

When it is determined in determining unit 217 that the user or division information represents the user or the division for which the use of any function is restricted, administrator restriction list generating unit 219 refers to the table (FIG. 7) stored in function restriction storing unit 209 and extracts from the function restriction list (FIG. 8) stored in function restriction list storing unit 213 the information regarding the restriction(s) set with respect to the function of which use is restricted for the relevant user or division, to generate an administrator restriction list, and adds to the list a label indicating that it is the administrator restriction list. When the administrator restriction list has already been generated, it updates the list by adding the extracted information to the list.

FIG. 9 shows that, as the function of which use is restricted for the above user or division, the information regarding the restrictions set for the "binding" function, stored in the function restriction list, is extracted from the function restriction list and included in the administrator restriction list.

Permanent restriction list generating unit 221 checks the state of configuration in the function restriction list (FIG. 8) stored in function restriction list storing unit 213. It extracts the information regarding any function of which use is determined to be restricted due to the current state of configuration of printing device 1, to generate a permanent restriction list, and adds to the list a label indicating that the list is the permanent restriction list. If the permanent restriction list has already been generated, it adds the extracted information to the list to thereby update the permanent restriction list. FIG. 10 shows that, as the function of which use is restricted due to the current state of configuration of printing device 1, the information regarding the restrictions set for the "hole punching" function, stored in the function restriction list, is extracted from the function restriction list and included in the permanent restriction list.

Temporary restriction list generating unit 223 checks the state of configuration and any restricted period in the function restriction list (FIG. 8) stored in function restriction list storing unit 213. It extracts the information regarding the function of which use is determined to be restricted on a per-period basis by the administrator, to generate a temporary restriction list, and adds to the list a label indicating that it is the temporary restriction list. If the temporary restriction list has already been generated, it adds the extracted information to the list to thereby update the temporary restriction list. FIG. 11 shows that, as the function of which use is restricted on a per-period basis, the information regarding the restrictions set for the "stapling" function, stored in the function restriction list, is extracted from the function restriction list and included in the temporary restriction list.

Determining unit 217 may be configured to compare the date and time when the user information and/or the division information was input from user/division information acquiring unit 215 with the restricted period in the function restriction list (FIG. 8) stored in function restriction list storing unit 213, to determine whether the date and time when the user information or the division information was input falls within the period during which the use of any function is restricted, and provide the determined result to temporary restriction list generating unit 223. With this configuration, in the case where it is determined in determining unit 217 that the date and time when the user information and/or the division information was input falls within the period during which the use of any function is restricted, temporary restriction list generating unit 223 extracts the information regarding the relevant function to generate or update the temporary restriction list.

List sending unit 225 sends the thus generated administrator restriction list, permanent restriction list, and temporary restriction list, together with the corresponding messages if any (the messages are stored in the lists in the present example), via network 7 to user's PC 5. It also sends the fixed message table stored in fixed message storing unit 207.

Figure 12:
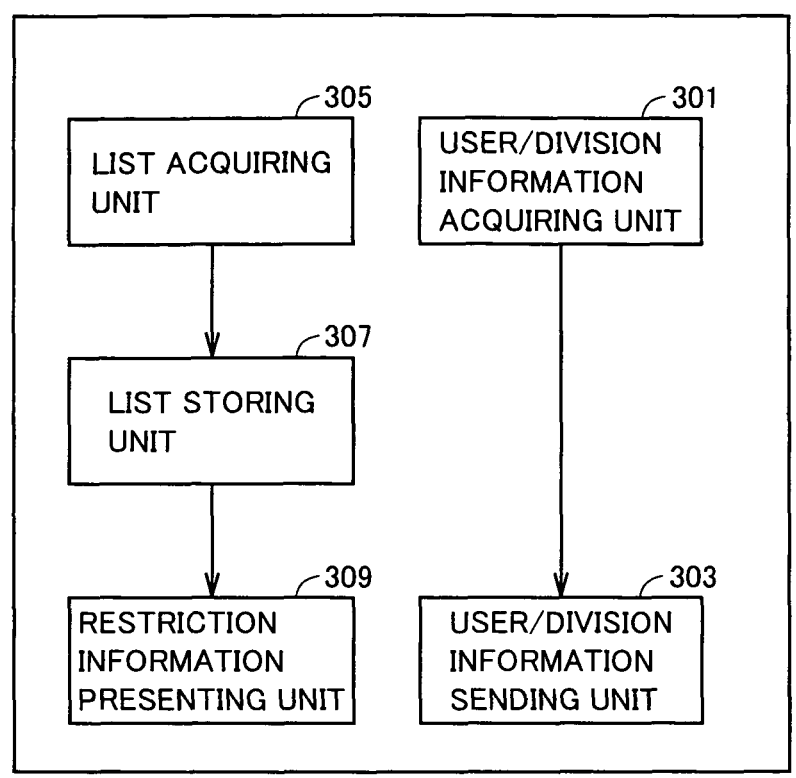
FIG. 12 is a block diagram showing a specific example of functional configuration for presenting to a user the information regarding the restriction of use of functions in user's PC 5.

Functional units for presenting to a user the information regarding the restrictions of use of functions in user's PC 5, shown in FIG. 12, are formed at CPU 101 of user's PC 5 as CPU 101 reads and executes a program stored in ROM 103 or the like to activate the printer driver. Alternatively, at least a part thereof may be realized with the hardware configuration of user's PC 5 shown in FIG. 3.

Referring to FIG. 12, the above-described functional units of user's PC 5 include a user/division information acquiring unit 301, a user/division information sending unit 303, a list acquiring unit 305, a list storing unit 307, and a restriction information presenting unit 309.

User/division information acquiring unit 301 acquires user information and/or division information of the user who uses the printer driver to operate printing device 1, by receiving a user operation in accordance with a log-in screen or the like, or by reading the log-in information received in advance and stored in a prescribed storing area, for example. User/division information sending unit 303 sends the acquired user information and/or division information via network 7 to printing device 1, and inquires about any restriction set on the use of the functions of printing device 1.

List acquiring unit 305 acquires the administrator restriction list, the permanent restriction list and the temporary restriction list from printing device 1 via network 7, and stores the lists in list storing unit 307. Restriction information presenting unit 309 presents the restriction information to the user by displaying the same on display unit 115 based on the lists stored in list storing unit 307.

Figure 13:
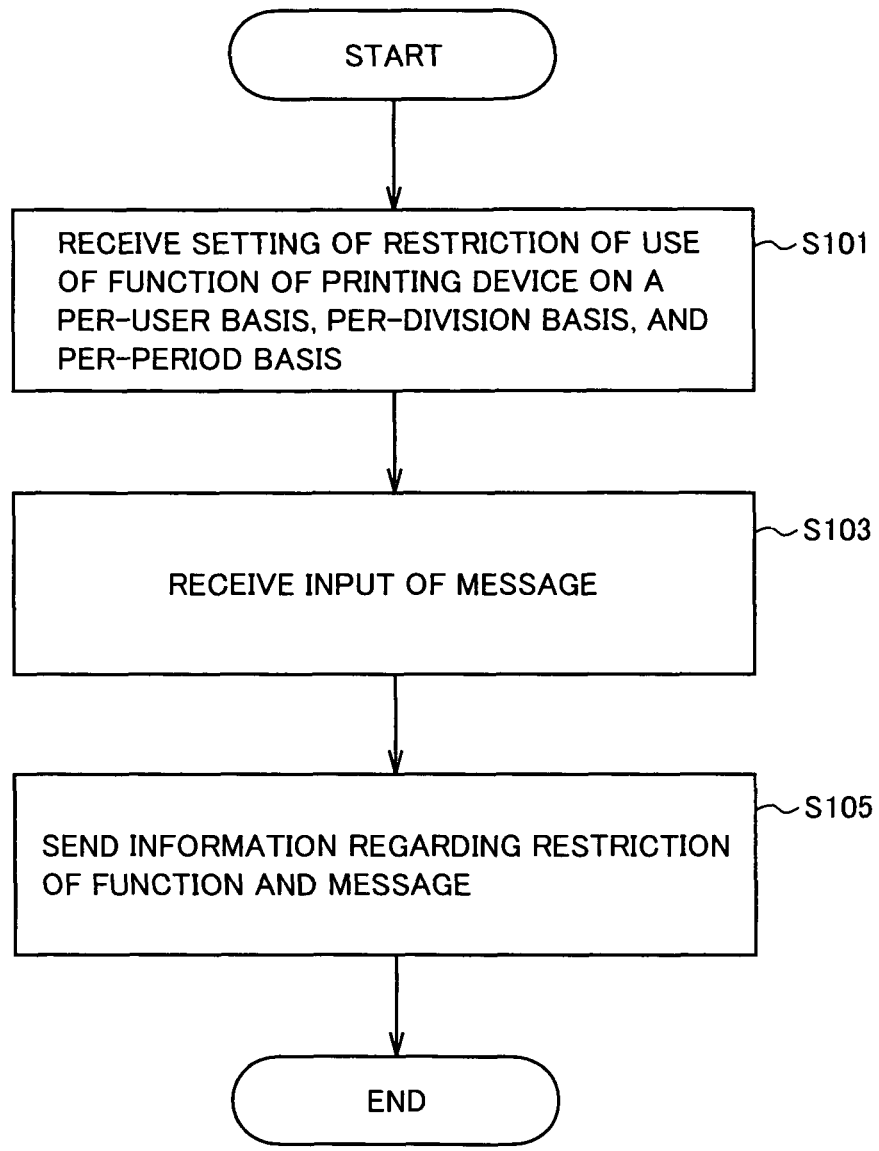
FIG. 13 is a flowchart showing a flow of processing executed in administrator's PC 3.

Processing executed at administrator's PC 3, shown by a flowchart in FIG. 13, is implemented as CPU 101 reads and executes a program for remote setting tool stored in ROM 103 or the like, to control the functional units of the remote setting tool.

Referring to FIG. 13, administrator's PC 3 receives, via input unit 111, an input of setting of a restriction of use on a per-period basis, a restriction of use on a per-user basis and a restriction of use on a per-division basis (step S101), and also receives an input of an input massage (step S103), in accordance with the UI as shown in FIG. 4. It associates the information regarding the restrictions on the functions with the input messages, both received in step S101, and sends them from communication unit 113 via network 7 to printing device 1 (step S105).

Figure 14:
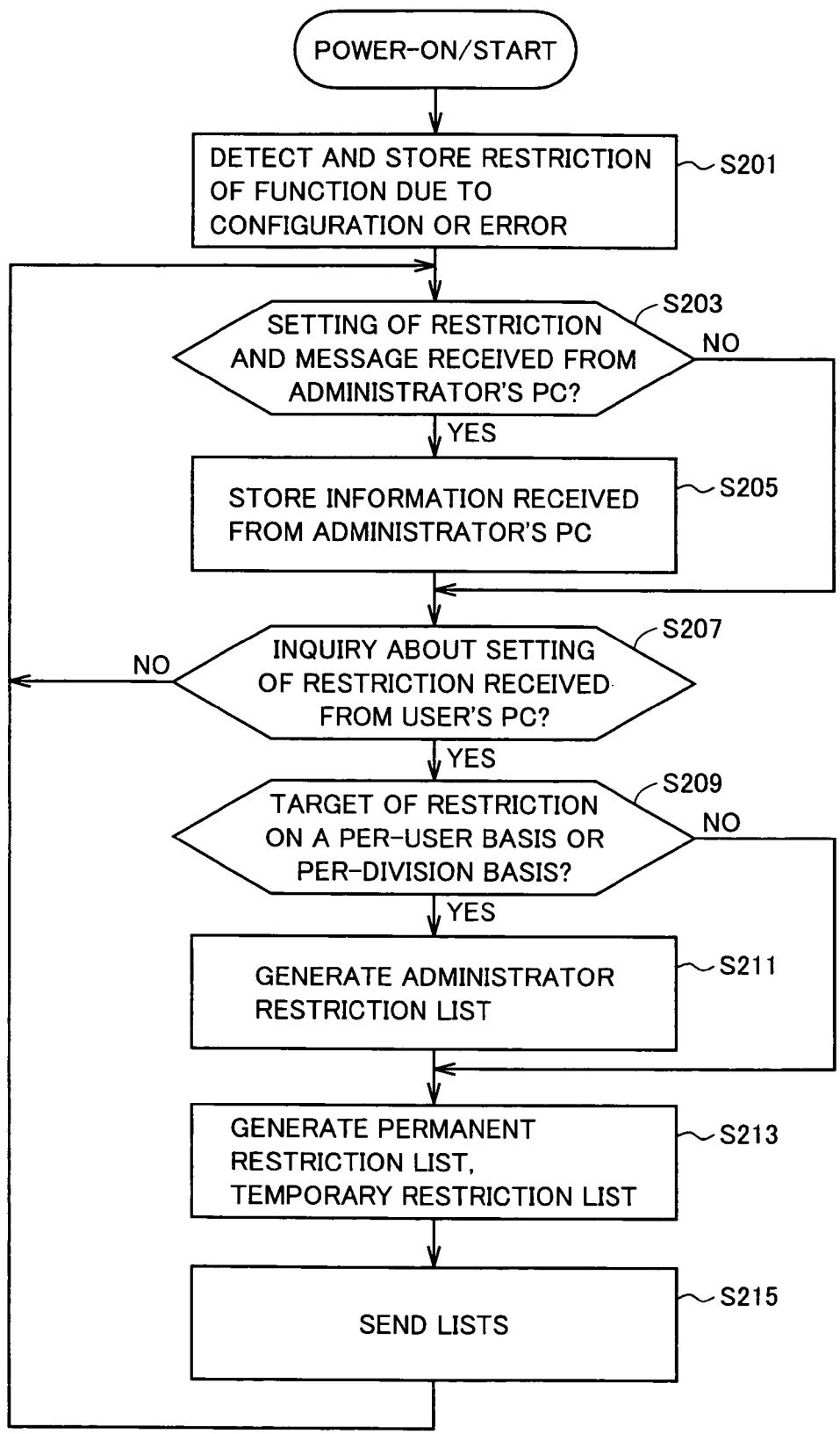
FIG. 14 is a flowchart showing a flow of processing executed in printing device 1.

Processing executed at printing device 1, shown by a flowchart in FIG. 14, is started when printing device 1 is turned on and activated. The processing is implemented as CPU 10 reads and executes a program stored in storage unit 20 or the like, to control the functional units shown in FIG. 5.

Referring to FIG. 14, firstly, when printing device 1 is activated, state acquiring unit 201 checks the states of the respective parts to detect any function of which use is restricted, such as a function unavailable due to the state of configuration, or a function unusable due to a shortage of resources like staples or due to an error such as paper jam. Based on the detected results, function restriction list generating unit 211 generates the above-described function restriction list, and stores it in function restriction list storing unit 213 (step S201).

Next, when administrator setting input unit 205 and message input unit 203 receive the information regarding the restrictions on functions and the input messages sent from administrator's PC 3 in step S105 described above (YES in step S203), function restriction list generating unit 211 generates the function restriction list including the corresponding input messages if any, based on the received information, and stores the list in function restriction list storing unit 213 (step S205).

Next, when user/division information acquiring unit 215 receives from user's PC 5 the user information and/or division information and the inquiry about any restriction on the functions of printing device 1 (YES in step S207), determining unit 217 determines whether the user information or the division information acquired in step S207 corresponds to the user or the division for which the use of function is restricted in the function restriction list generated in step S205 (step S209). As a result, if the user information or the division information acquired in step S207 corresponds to the user or the division for which the use of function is restricted (YES in step S209), administrator restriction list generating unit 219 generates the above-described administrator restriction list by extracting, from the function restriction list stored in function restriction list storing unit 213, the information regarding the restrictions set with respect to the function for which the restriction on use is set for the relevant user or division, and by adding to the list a label indicating that it is the administrator restriction list (step S211). Subsequently, permanent restriction list generating unit 221 and temporary restriction list generating unit 223 generate the above-described permanent restriction list and the temporary restriction list, respectively, by extracting, from the function restriction list stored in function restriction list storing unit 213, the information regarding the function of which the use is restricted due to the current state of configuration of printing device 1 and the information regarding the function of which the use is restricted on a per-period basis by the administrator, and by adding to each list a label indicating that it is the permanent restriction list or the temporary restriction list (step S213). List sending unit 225 then sends the lists, generated in steps S211 and S213, and also storing the corresponding input messages if any, to user's PC 5 (step S215). The fixed messages stored in fixed message storing unit 207 may also be sent, as required.

The above-described processing is carried out while printing device 1 is active. Reception of the information regarding the setting from administrator's PC 3 in step S203 or the inquiry from user's PC 5 in step S207 is awaited, and in receipt of either of them, the subsequent processing is executed.

The administrator restriction list is generated when it is determined in step S209 that the user information or the division information received in step S207 corresponds to the target of restriction of the use of the function. If it is determined otherwise (NO in step S209), the administrator restriction list is not generated, with step S211 being skipped.

Further, in step S213, the permanent restriction list and the temporary restriction list do not have to be generated if the function restriction list stored in function restriction list storing unit 213 does not include the information regarding the function of which the use is restricted due to the current state of configuration of printing device 1 or the information regarding the function of which the use is restricted on a per-period basis by the administrator.

Figure 15:
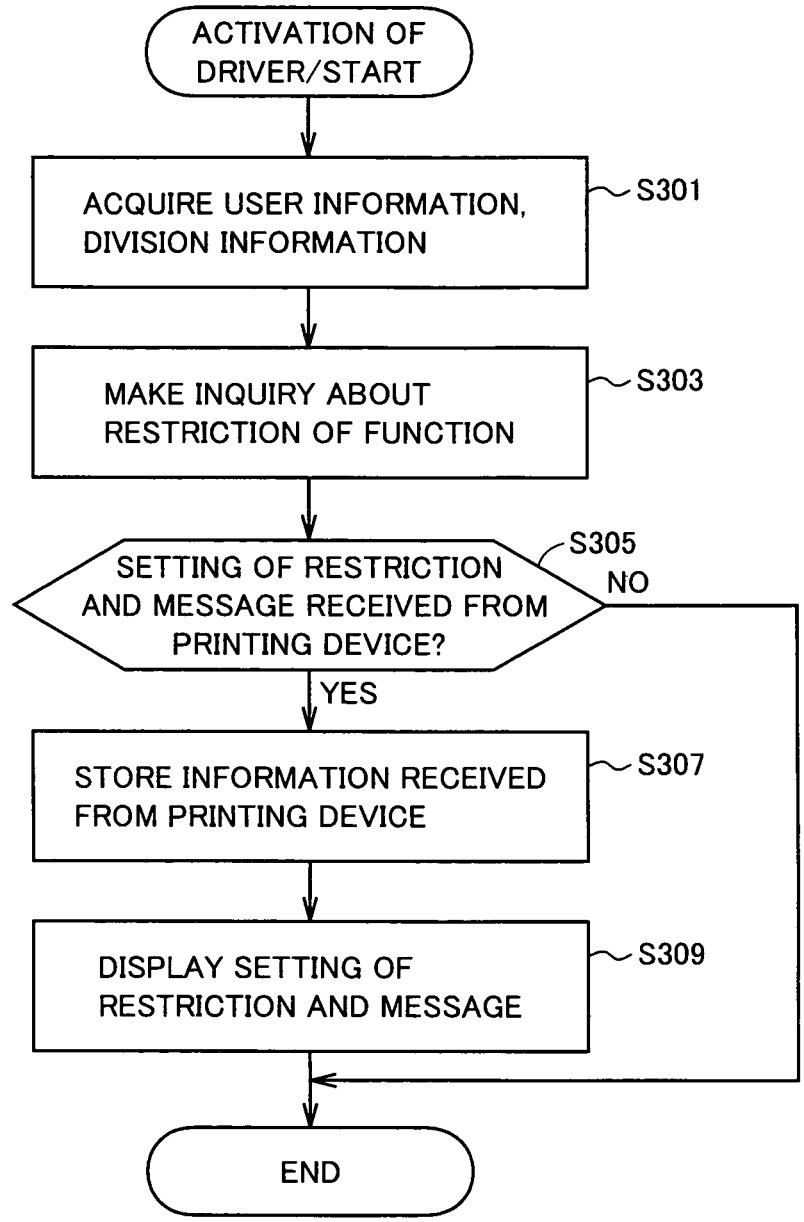
FIG. 15 is a flowchart showing a flow of processing executed in user's PC 5.

Processing executed at user's PC 5, shown by a flowchart in FIG. 15, is started as CPU 101 of user's PC 5 reads and executes a program stored in ROM 103 or the like to activate the printer driver, and is implemented by controlling the functional units shown in FIG. 12.

Referring to FIG. 15, firstly, when the printer driver is activated, user/division information acquiring unit 301 acquires user information and/or division information (step S301). User/division information sending unit 303 sends the information to printing device 1 and inquires about any restriction set on the use of the functions of printing device 1 (step S303).

Thereafter, when list acquiring unit 305 acquires the lists storing the information regarding the restrictions set on the functions and the corresponding input messages if any, sent from printing device 1 in the above-described step S215 (YES in step S305), the relevant information is stored in list storing unit 307 (step S307), and restriction information presenting unit 309 displays the same (step S309).

Hereinafter, specific examples of display in step S309 will be given with reference to FIGS. 16-20.

Figure 16:
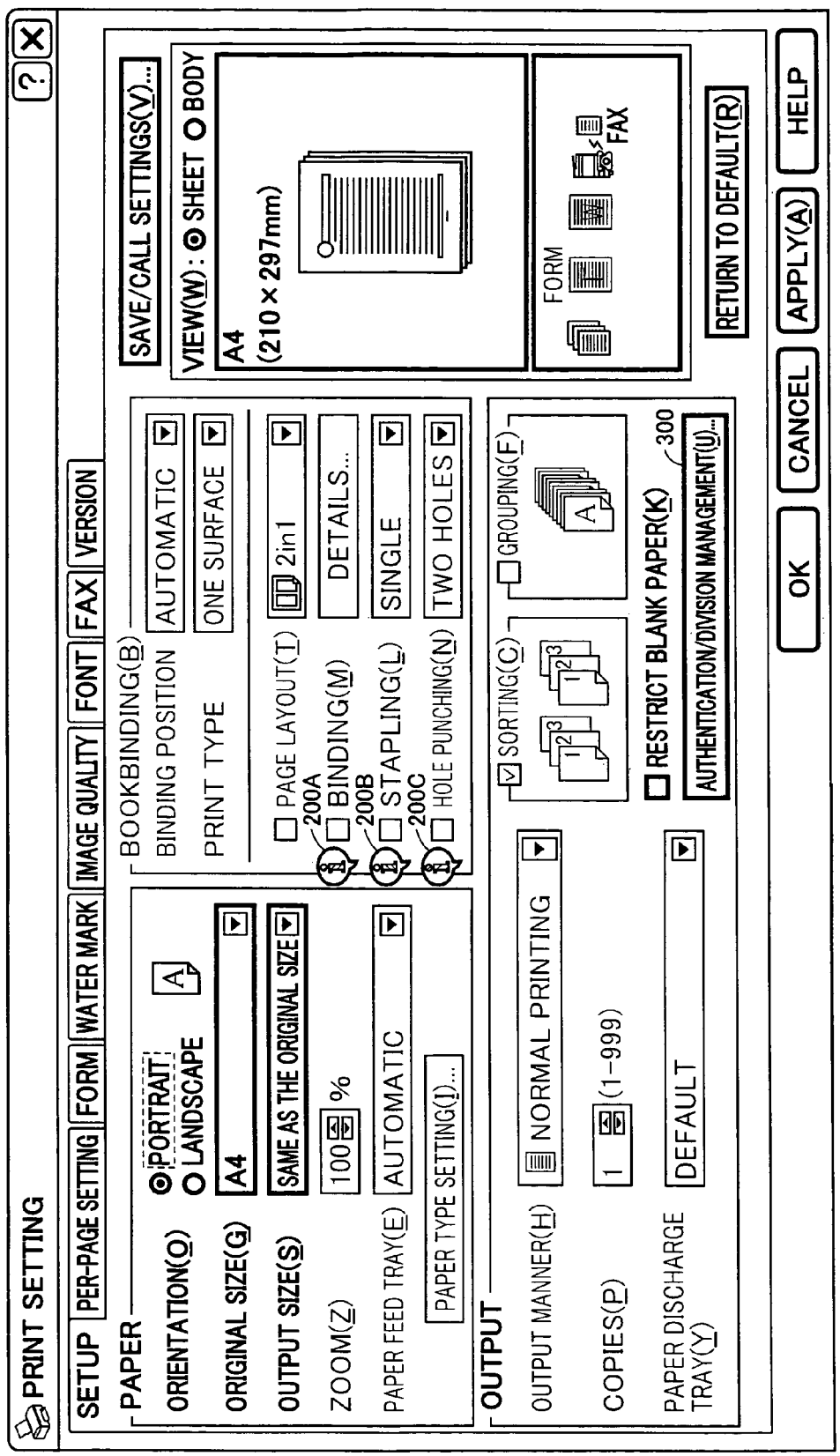
FIG. 16 shows a specific example of a print setting screen.

FIG. 16 shows a specific example of a screen displayed on display potion 115 in step S309 when the printer driver is activated in user's PC 5. The screen shown in FIG. 16 is a print setting screen on which a user who is about to operate printing device 1 performs various setting for printing.

Restriction information presenting unit 309 refers to the lists, received in step S305 and storing the information regarding the restrictions set on the functions, and determines the type of restriction set for each restriction, i.e., whether it is a restriction on a per-user basis or a per-division basis set by the administrator, a temporary restriction, or a permanent restriction. Specifically, such types of the restrictions can be specified by checking the label added to each list sent from printing device 1. Restriction information presenting unit 309 displays the functions on the print setting screen in such a manner that any function of which use is restricted is grayed out to prevent selection thereof. In FIG. 16, for the sake of expressing the screen on paper, selectable areas are shown using bold lines and bold letters, while non-selectable areas and characters are shown in thin, dotted lines and thin letters, to indicate that the non-selectable areas and characters are grayed out on the screen. Specifically, as the unusable functions, the "binding" function, the "stapling" function and the "hole punching" function are displayed in a gray-out manner in FIG. 16, to hinder selection thereof.

Restriction information presenting unit 309 also displays buttons 200A-200C for use in displaying detailed information, in association with the displays of the functions of which use is restricted, which are displayed in a manner prohibiting selection thereof Buttons 200A-200C each represent the type of the restriction set on the corresponding function. In the case of FIG. 16, a mark within each of buttons 200A-200C is applied with a color corresponding to the type of the restriction.

More specifically, button 200A is displayed in association with display of the "binding" function, near the button for selecting the "binding" function (which is displayed in a manner prohibiting selection), for displaying detailed information about the "binding" function of which use is restricted. Button 200A is applied with a first color, indicating that the type of the restriction set on the "binding" function is a restriction set by the administrator.

Button 200B is displayed in association with display of the "stapling" function, near the button for selecting the "stapling" function (which is displayed in a manner prohibiting selection), for displaying detailed information about the "stapling" function of which use is restricted. Button 200B is applied with a second color, indicating that the type of the restriction set on the "stapling" function is a temporary restriction.

Button 200C is displayed in association with display of the "hole punching" function, near the button for selecting the "hole punching" function (which is displayed in a manner prohibiting selection), for displaying detailed information about the "hole punching" function of which use is restricted. Button 200C is applied with a third color, indicating that the type of the restriction set on the "hole punching" function is a permanent restriction.

Although the specific example of presenting the type of restriction using a color corresponding thereto is shown in FIG. 16, the presenting method is not restricted thereto; any presenting method that can display different types of restrictions in different manners may be used.

Figure 17:
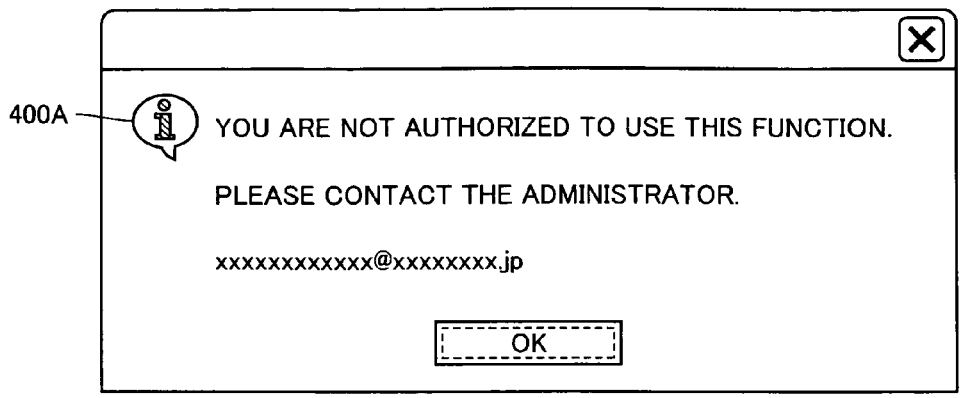
FIGS. 17-19 each show a specific example of a screen for notifying of detailed information regarding the restriction.

FIG. 17 is a screen for notifying of detailed information about the function for which a restriction of use has been set on a per-user basis or on a per-division basis by the administrator. The screen shown in FIG. 17 includes the information indicating that the function (herein, the "binding" function) associated with button 200A is a function for which the administrator has set a restriction of use on a per-user basis or on a per-division basis, and that the user who is about to operate printing device 1 using the printer driver or the division to which the user belongs is included in the target of restriction. Further, in FIG. 17, a mark 400A associated with button 200A is displayed (herein, it is assumed that the mark is applied with the same color) to indicate that the screen is for notifying of the detailed information about the function associated with button 200A.

Restriction information presenting unit 309, when detecting depression of button 200A on the print setting screen of FIG. 16, displays the screen of FIG. 17 instead of the print setting screen of FIG. 16, or in a pop-up manner on the screen of FIG. 16, and displays a text reading "You are not authorized to use this function." to inform the user of the type of the specified restriction and the reason why the use is restricted. The above text is obtained as restriction information presenting unit 309 selects a fixed message corresponding to the type of the specified restriction from among the fixed messages acquired in advance from printing device 1 and stored, or from among the fixed messages prestored in user's PC 5. Other information used for notifying the user of the reason why the use of the function is restricted may include an illustration, mark or picture representing the content, a particular color or pattern, sound or animation, or any combination thereof. The same applies to any of the specific display examples explained below.

In the case where the restriction list stores an input message related to the setting of the restriction for the function (herein, the "binding" function) associated with button 200A, restriction information presenting unit 309 displays the input message as well. Since the administrator restriction list shown in FIG. 9 stores the input message of "Please contact the administrator." in association with the information regarding the restriction set on the "binding" function, the relevant message is also displayed on the screen of FIG. 17.

Figure 18:
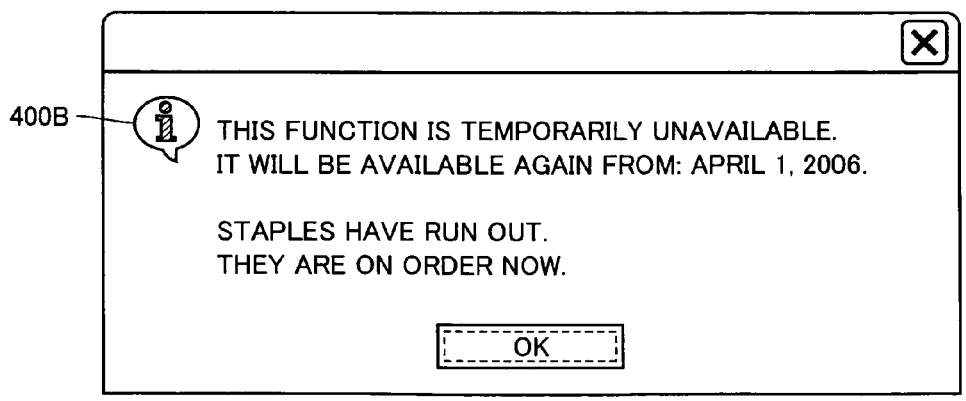

FIG. 18 is a screen for notifying of detailed information about the function for which a restriction of use has been set temporarily on a per-period basis by the administrator. The screen shown in FIG. 18 includes the information indicating that the function (herein, the "stapling" function) associated with button 200B is a function for which the administrator has set a restriction of use temporarily on a per-period basis. Further, in FIG. 18, a mark 400B associated with button 200B is displayed (herein, it is assumed that the mark is applied with the same color) to indicate that the screen is for notifying of the detailed information about the function associated with button 200B.

Restriction information presenting unit 309, when detecting depression of button 200B on the print setting screen of FIG. 16, displays the screen of FIG. 18 instead of, or in a pop-up manner on, the screen of FIG. 16, and displays a text reading "This function is temporarily unavailable." to inform the user of the type of the specified restriction and the reason why the use is restricted.

Further, since the temporary restriction list shown in FIG. 11 stores the input message of "They are on order now." in association with the information regarding the restriction set on the "stapling" function, the relevant message is also displayed on the screen of FIG. 18. Still further, since a fixed message associated with the state of configuration is designated in the temporary restriction list shown in FIG. 11, the fixed message of "The staples have run out.", which is designated from the fixed message list (FIG. 6) received in advance from printing device 1 and stored in user's PC 5, is also displayed.

Figure 19:
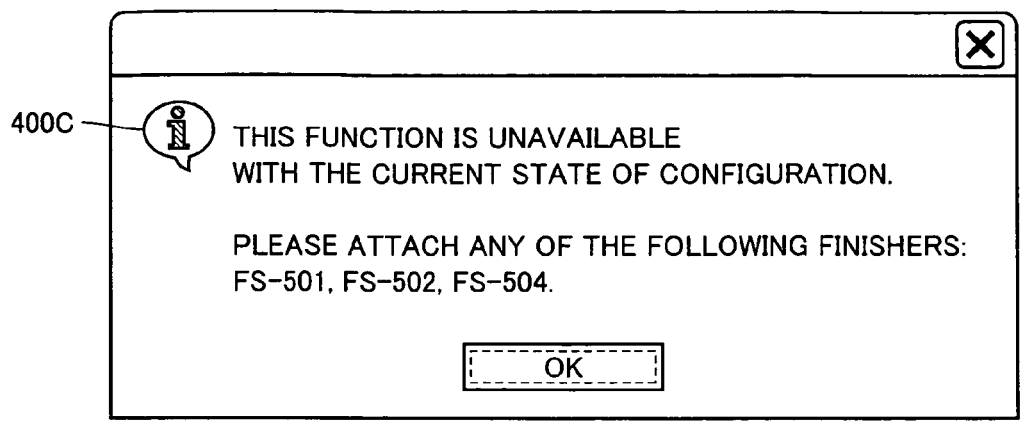

FIG. 19 is a screen for notifying of detailed information about the function of which use is restricted permanently due to the state of configuration of printing device 1. The screen shown in FIG. 19 includes the information indicating that the function (herein, the "hole punching" function) associated with button 200C is a function of which the use is restricted permanently. Further, in FIG. 19, a mark 400C associated with button 200C is displayed (herein, it is assumed that the mark is applied with the same color) to indicate that the screen is for notifying of the detailed information about the function associated with button 200C.

Restriction information presenting unit 309, when detecting depression of button 200C on the print setting screen of FIG. 16, displays the screen of FIG. 19 instead of, or in a pop-up manner on, the screen of FIG. 16, and displays a text reading "This function is unavailable with the current state of configuration." to inform the user of the type of the specified restriction and the reason why the use is restricted.

Further, since a fixed message related to the state of configuration of the "hole punching" function has been designated in the permanent restriction list shown in FIG. 10, the fixed message of "Please attach any of the following finishers . . . ", designated from the fixed message list (FIG. 6) received in advance from printing device 1 and stored in user's PC 5, is also displayed.

In step S309 described above, restriction information presenting unit 309 notifies of the type of the restriction of the function on the print setting screen shown in FIG. 16. This allows a user who is about to operate printing device 1 using the printer driver to recognize the situation regarding any restriction of use of the functions at the time of activation of the printer driver, and also understand the reason why the use of the function is restricted, if any. Further, when the screen of one of FIGS. 17-19 is displayed in response to manipulation of the corresponding button, with the input message displayed thereon, the user can confirm the reason why the use is restricted in more detail. This facilitates the user's planning of the subsequent printing job(s).

Figure 20:
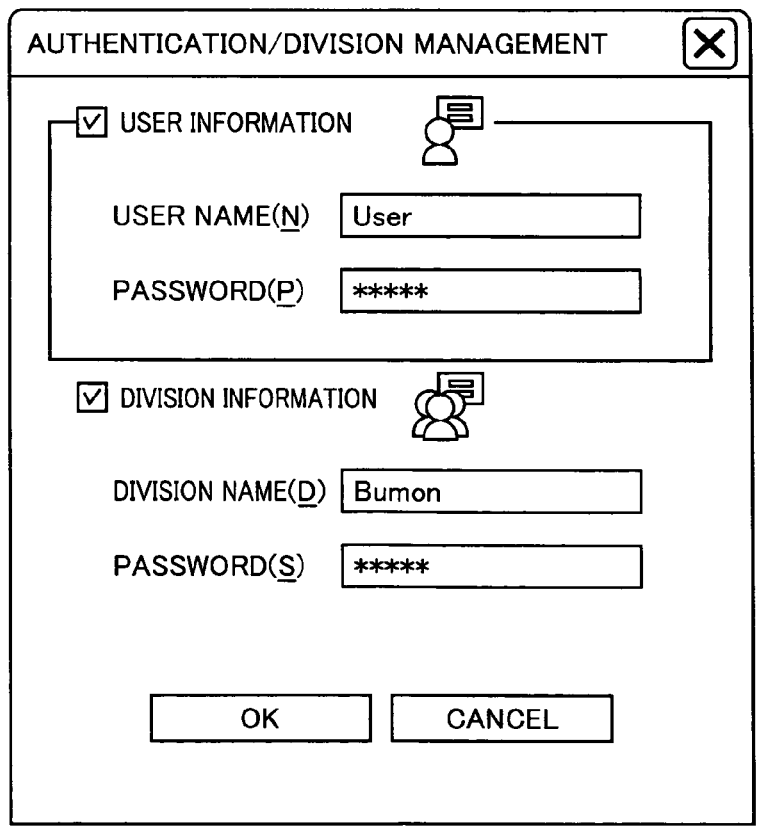
FIG. 20 shows a specific example of an authentication/division management screen.

In the specific processing example described above, in step S301, user/division information acquiring unit 301 acquires user information and/or division information based on the log-in information and the like input in advance when the user logs in to the network by activating user's PC 5. Alternatively, an input of the information may be received after the activation of the printer driver. For example, it may be configured such that an authentication/division management screen shown in FIG. 20 is displayed when a button 300 for performing authentication and division management is depressed on the print setting screen shown in FIG. 16, to receive an input of user information, including a user name and a password, and/or division information, including a division name and a password, by following the screen after the activation of the printer driver. In this case, at the time when the above information is received, the processing shown in FIG. 15 is carried out again, and in step S303, user/division information sending unit 303 sends to printing device 1 the new user information and/or division information changed from the information at the time of activation of the printer driver, and inquires about the restrictions on the functions. As such, after the print setting screen shown in FIG. 16 is displayed upon activation of the printer driver, if the user information or the like is changed by depression of button 300, the screen is updated to a new print setting screen reflecting the relevant information as a result of the above-described processing.

It is noted that the configurations of printing device 1, the configuration of user's PC 5 and the configuration of administrator's PC 3 implementing the remote setting tool, shown in FIGS. 5 and 12 and described above, correspond to a specific example of configuration of the print system of the present embodiment, the configuration for implementing the present invention is not restricted thereto. Specifically, at least a part of the configuration for implementing the remote setting tool may be included in printing device 1, and some of the functional units of printing device 1 shown in FIG. 5 may be included in the user's PC 5 side. Further, as described above, administrator's PC 3 alone may perform the above-described processing as the print control apparatus controlling the printing functions of printing device 1. Alternatively, administrator's PC 3 and user's PC 5, or administrator's PC 3 and printing device 1, may be implemented as a single device to serve as the above-described print control apparatus. Still further, as described above, user's PC 5 alone may perform the above-described processing as the operating device operating printing device 1. Alternatively, printing device 1 and user's PC 5, or administrator's PC 3 and printing device 1, may be implemented as a single device to serve as the operating device. Still further, the processing illustrated in FIGS. 13-15 may be carried out by any of the devices. The present invention may include any combination of the functional units provided for the devices and any combination of the processing executed by the devices. As a specific example, printing device 1 may include at least state acquiring unit 201 alone, and also include a functional unit sending the acquired result to user's PC 5, and the remaining functional units of printing device 1 shown in FIG. 5 may be included in the user's PC 5 side. In this case, of the processing shown in FIG. 14, the processing in and after step S203 is executed in user's PC 5.

When the print control method of the present invention is used, in the case where use of a function incorporated in a printing device is restricted, a user who is about to perform printing using the printing device can understand the reason why the use is restricted, i.e., whether the use is restricted permanently or temporarily, or whether the use is restricted as an administrator has set the restriction individually, so that the user can readily plan the printing job(s). Such notification is made by the printer driver. Therefore, the user can recognize the situation, when performing an operation for printing using the printer driver, without the need of starting another application or the like.

Further, it is also possible to provide a program for causing a computer to carry out the above-described processing. Such a program may be recorded on a computer-readable recording medium such as a flexible disk, CD-ROM, ROM, RAM or memory card attached to the computer, and provided as a program product. Alternatively, the program may be provided by recording the same on a recording medium such as a hard disk built in the computer. The program may also be provided by downloading via a network.

The program of the present invention may be one that calls necessary modules at prescribed timings in a prescribed sequence from among the program modules provided as a part of the operation system (OS) of the computer, to cause the processing to be executed. In this case, the modules are not included in the program itself, and the processing is executed in cooperation with the OS. Such a program not containing the modules may be included in the programs of the present invention.

Further, the program of the present invention may be provided in a manner incorporated in a part of another program. In this case as well, modules included in the other program are not included in the program itself, and the processing is executed in cooperation with the other program. Such a program incorporated in another program may also be included in the programs of the present invention.

The program product provided is installed in a program storage unit such as a hard disk for execution. The program product includes the program itself and a recording medium on which the program is recorded.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A print control method for controlling a printing device incorporating a plurality of functions related to printing by using a print control apparatus, comprising:
   an acquiring step of acquiring information indicating that a restriction is set on use of each function from the plurality of functions of said printing device in said print control apparatus; and
   a presenting step of presenting that the use of each function from the plurality of functions is restricted and a type of said restriction determined from a plurality of types of restriction based on said information in said print control apparatus, wherein each type of restriction is different from one another for each function from the plurality of functions.

2. The print control method according to claim 1, wherein said restriction includes a first restriction and a second restriction, and
   said presenting step presents the types of said restrictions in a first presenting manner corresponding to said first restriction and in a second presenting manner corresponding to said second restriction.

3. The print control method according to claim 1, wherein said restriction includes at least one of a restriction of use on a per-period basis, a restriction of use on a per-user basis, a restriction of use on a basis of a division to which the user belongs, and a restriction due to a configuration of said printing device.

4. The print control method according to claim 1, wherein a message related to said restriction of use of said function is acquired in said acquiring step, and
   said presenting step includes a message presenting step of presenting said message.

5. The print control method according to claim 4, wherein said message is information designating a prestored, fixed message.

6. The print control method according to claim 4, wherein said message is a message input to said printing device in association with said restriction of use of said function.

7. The print control method according to claim 4, wherein said message is presented in said message presenting step in response to a prescribed manipulation made to said type of said restriction presented in said presenting step.

8. The print control method according to claim 1, wherein said restriction of use of said function is set for a first user, said method further comprising the steps of:
   obtaining information of a user operating said printing device; and
   determining whether said user is said first user or not; wherein
   the information indicating that said restriction of use of said function is set for said user is acquired in said acquiring step, when it is determined that said user is said first user.

9. The print control method according to claim 1, wherein said restriction of use of said function is set for a first division, said method further comprising the steps of:
   obtaining information of a user operating said printing device; and
   determining whether said user belongs to said first division or not; wherein
   the information indicating that said restriction of use of said function is set for said first division to which said user belongs is acquired in said acquiring step, when it is determined that said user belongs to said first division.

10. The print control method according to claim 1, wherein said restriction of use of said function is set on a prescribed period,
    said method further comprising the step of determining whether a time of operation of said printing device falls within said prescribed period or not, wherein
    the information indicating that said restriction of use of said function is set on said prescribed period is acquired in said acquiring step, when it is determined that said time of operation of said printing device falls within said prescribed period.

11. The print control method according to claim 1, further comprising the steps of:
    setting said restriction of use of said function of said printing device in said print control apparatus; and
    inputting a message in association with said restriction; wherein said message is acquired in said acquiring step, and
said presenting step includes a message presenting step of presenting said message.

12. The print control method according to claim 1, wherein the restriction on use of each function from the plurality of functions and the type of said restriction is presented prior to print processing.

13. A print control apparatus for controlling a printing device incorporating a plurality of functions related to printing, comprising:
an inquiring unit inquiring about a restriction of use of each function from the plurality of functions of said printing device;
an acquiring unit acquiring information regarding said restriction of use of each function from the plurality of functions in response to said inquiry; and
a presenting unit presenting that the use of each function from a plurality of functions is restricted and a type of said restriction determined from a plurality of types of restriction based on said information, wherein each type of restriction is different from one another for each function from the plurality of functions.

14. The print control apparatus according to claim 13, further comprising a determining unit determining whether data extracted from said inquiry corresponds to data regarding a target of said restriction or not, wherein
said acquiring unit acquires said information regarding said restriction of use of each function from the plurality of functions for which said data extracted from said inquiry is the target of said restriction, when it is determined that said data extracted from said inquiry corresponds to the data regarding said target of said restriction.

15. The print control apparatus according to claim 14, wherein
said restriction of use of each function is set for a first user,
said inquiry includes data regarding a user operating said printing device,
said determining unit determines whether said user is said first user or not, and
said acquiring unit acquires information indicating that said restriction of use of each function is set for said user, when it is determined that said user is said first user.

16. The print control apparatus according to claim 14, wherein
said restriction of use of each function is set for a first division,
said inquiry includes data regarding a user operating said printing device,
said determining unit determines whether said user belongs to said first division or not, and
said acquiring unit acquires information indicating that said restriction of use of each function is set for said first division, when it is determined that said user belongs to said first division.

17. The print control apparatus according to claim 14, wherein
said restriction of use of each function is set for a prescribed period,
said determining unit determines whether said inquiry has been made during said prescribed period or not, and
said acquiring unit acquires information indicating that said restriction of use of each function is set for said prescribed period, when it is determined that said inquiry has been made during said prescribed period.

18. The print control apparatus according to claim 13, wherein
said acquiring unit acquires a message input in association with said restriction of use of each function, and
said presenting unit presents said message.

19. The print control apparatus according to claim 13, further comprising:
a setting input unit receiving setting of said restriction of use of each function; and
a message input unit receiving an input of a message related to said restriction of use of each function; wherein
said acquiring unit acquires said message related to said restriction together with information regarding said restriction of use of each function, and
said presenting unit presents said message related to said restriction.

20. The print control apparatus according to claim 13, wherein the presenting unit presents the restriction on use of each function from the plurality of functions and the type of said restriction prior to print processing.

* * * * *